(12) United States Patent
Dreher et al.

(10) Patent No.: US 10,670,093 B2
(45) Date of Patent: Jun. 2, 2020

(54) BACKING PLATE FOR A DISK BRAKE LINING, DISK BRAKE LINING, AND FIXED-CALIPER DISK BRAKE THEREFOR

(71) Applicant: Continental Teves AG & Co. oHG, Frankfurt (DE)

(72) Inventors: Herbert Dreher, Groß-Gerau (DE); Dietrich Golz, Bad Camberg (DE); Götz Mehner, Königstein (DE); Andreas Marr, Hünfelden (DE); Mathias Haag, Darmstadt (DE); Frederic Zimnoch, Roßdorf (DE)

(73) Assignee: Continental Teves AG & Co. oHG, Frankfurt (DE)

( * ) Notice: Subject to any disclaimer, the term of this patent is extended or adjusted under 35 U.S.C. 154(b) by 49 days.

(21) Appl. No.: 15/908,487

(22) Filed: Feb. 28, 2018

(65) Prior Publication Data

US 2018/0195569 A1 Jul. 12, 2018

Related U.S. Application Data

(63) Continuation of application No. PCT/EP2016/069530, filed on Aug. 17, 2016.

(30) Foreign Application Priority Data

Aug. 31, 2015 (DE) .......... 10 2015 216 592
May 25, 2016 (DE) .......... 10 2016 209 069

(51) Int. Cl.
*F16D 65/097* (2006.01)
*F16D 65/092* (2006.01)
(Continued)

(52) U.S. Cl.
CPC ............ *F16D 65/092* (2013.01); *B60T 1/065* (2013.01); *F16D 55/228* (2013.01);
(Continued)

(58) Field of Classification Search
CPC .. F16D 65/095; F16D 65/097; F16D 65/0972; F16D 65/0979; F16D 55/00; F16D 55/227
(Continued)

(56) References Cited

U.S. PATENT DOCUMENTS 3,638,765 A * 2/1972 Flaherty .............. F16D 65/0972
188/73.38
4,134,477 A 1/1979 Asquith
(Continued)

FOREIGN PATENT DOCUMENTS

CN 1133082 A 10/1996
CN 1798933 A 7/2006
(Continued)

OTHER PUBLICATIONS

Breuer, Bert, et al, Bremsenhandbuch—Grundlagen, Komponenten, Systeme, Fahrdynamik, 2006, vol. 3,Friedr. Vieweg & Sohn Verlag, Wiesbaden Germany.
(Continued)

*Primary Examiner* — Christopher P Schwartz (57) ABSTRACT

A backing plate for a disk brake lining, a disk brake lining, and a motor-vehicle partially lined disk brake, wherein the backing plate and a corresponding disk brake lining having friction material are provided and wherein a retaining protrusion having a through-hole for receiving a retaining pin is provided on the backing plate radially inside on an end face, and wherein a guide protrusion having a jaw opening and having a receiving pocket for receiving a guide pin is positioned radially outside on the opposite end face.

15 Claims, 7 Drawing Sheets

(51) Int. Cl.
  *F16D 55/228*   (2006.01)
  *F16D 65/095*   (2006.01)
  *B60T 1/06*     (2006.01)
  *F16D 65/18*    (2006.01)
  *F16D 55/00*    (2006.01)
  *F16D 65/02*    (2006.01)
  *F16D 121/04*   (2012.01)

(52) U.S. Cl.
  CPC .......... *F16D 65/095* (2013.01); *F16D 65/18* (2013.01); *F16D 2055/007* (2013.01); *F16D 2065/026* (2013.01); *F16D 2121/04* (2013.01)

(58) Field of Classification Search
  USPC ........ 188/73.36–73.38, 79.44, 79.45, 250 B, 188/250 D, 250 E, 250 G, 258
  See application file for complete search history.

(56) References Cited

U.S. PATENT DOCUMENTS

| | | | | |
|---|---|---|---|---|
| 4,350,229 | A | * | 9/1982 | Ito .................. F16D 55/227 188/73.32 |
| 4,355,707 | A | * | 10/1982 | Saito ................ F16D 55/227 188/73.32 |
| 4,560,037 | A | * | 12/1985 | Gumkowski ....... F16D 65/0979 188/73.38 |
| 8,517,152 | B2 | | 8/2013 | Zenzen et al. |
| 2004/0154882 | A1 | | 8/2004 | Vezzoli et al. |
| 2009/0236187 | A1 | | 9/2009 | Bach et al. |
| 2013/0277159 | A1 | | 10/2013 | Borgmeier et al. |

FOREIGN PATENT DOCUMENTS

| | | |
|---|---|---|
| CN | 102918293 A | 2/2013 |
| CN | 103477110 A | 12/2013 |
| CN | 104632950 A | 5/2015 |
| DE | 2809729 A1 | 9/1978 |
| DE | 3104863 A1 | 12/1981 |
| DE | 10312480 A1 | 10/2004 |
| DE | 60208085 T2 | 8/2006 |
| EP | 1604127 A1 | 12/2005 |
| EP | 2318728 A1 | 5/2011 |
| EP | 2318729 A1 | 5/2011 |
| EP | 2746612 A1 | 6/2014 |
| EP | 2873886 A2 | 5/2015 |
| GB | 2069078 A | 8/1981 |
| JP | S58163833 | 9/1983 |
| JP | 2005155656 A | 6/2005 |
| JP | 2008014486 A | 1/2008 |
| JP | 2010101463 A | 5/2010 |
| JP | 2012117656 A | 6/2012 |
| JP | 2013190035 A | 9/2013 |
| KR | 1020080109863 A | 12/2008 |
| KR | 1020110125126 A | 11/2011 |
| WO | 2004083669 A1 | 9/2004 |
| WO | WO2004076885 A1 | 9/2004 |
| WO | WO2005064188 A1 | 7/2005 |
| WO | WO200511455 A1 | 11/2005 |
| WO | WO201151235 | 5/2011 |

OTHER PUBLICATIONS

International Search Report and Written Opinion dated Nov. 23, 2016 from corresponding International Patent Application No. PCT/EP2016/069530.

German Search Report dated Mar. 24, 2017 for corresponding German Patent Application No. 10 2016 209 069.0.

* cited by examiner

BACKING PLATE FOR A DISK BRAKE LINING, DISK BRAKE LINING, AND FIXED-CALIPER DISK BRAKE THEREFOR

CROSS REFERENCE TO RELATED APPLICATIONS

This application claims the benefit of International application No. PCT/EP2016/069530, filed Aug. 17, 2016, which claims priority to German patent application No. 10 2015 216 592.2, filed Aug. 31, 2015, each of which is hereby incorporated by reference herein in its entirety.

TECHNICAL FIELD

Embodiments of this invention relate to brake systems for motor vehicles, in particular to disk brakes.

BACKGROUND

Disk-brake lining backing plates supported symmetrically in a well of a fixed-caliper disk brake, which comprise cuboidal brake pads, are well known. It is primarily passenger cars have fixed-caliper disk brakes, wherein, for forward and reverse travel, the friction linings rest under compression, in each case on the exit side, against symmetrically radially oriented flanks of the well in the brake caliper housing and are correspondingly guided in the well (Bremsenhandbuch [Brake Handbook], Breuer/Bill; 3rd edition 2006, page 97, FIGS. 7-11, ISBN-13 978-3-8348-0064-0). With a very compact and stiff construction, however, the useful friction area is limited and the thermal balance is likewise susceptible of improvement.

Symmetrical disk brake linings that have a friction area which is enlarged in the circumferential direction have been disclosed, wherein lateral retaining protrusions with eyes to receive pins fixed to the housing are provided beyond the center of the backing plate, on each end face of the backing plate, being offset radially inward and being of identical height (i.e. at an identical distance from an axis of rotation of the wheel). In this case, the tangential forces are always borne by the entry-side pin, and the exit-side pin is used as a rotation lock as per U.S. Pat. No. 8,517,152 B2/WO 2005/064 188 A1. The advantage of this brake-lining and caliper design is the stiffness thereof, i.e. performance capacity and also thermal robustness. This symmetry of the backing plate is often preferred, for esthetic reasons among others. However, the noise characteristics of this backing plate mounting are regarded as susceptible of improvement, especially in the case of a change in the direction of rotation.

In a fully corresponding way, FIG. 13 of EP 2 873 886 A2 shows a backing plate having retaining protrusions that project laterally on both sides and have eyes for receiving pins, although these are arranged at different heights. At the core of this development is the general aim of imparting a radially inward-turning torque to a disk brake lining both for forward and for reverse travel. For this purpose, a description is given not only of a changeover between pull-type disk brake lining mounting during forward travel and push-type disk brake lining support during reverse travel but also of three points of support for supporting the disk brake lining in the brake, which act in various combinations on the backing plate. The NVH behavior appears to be susceptible of improvement since rattling noises during a change in the direction of rotation may be found objectionable.

Owing to ageing, harsh operating conditions, possibly in combination with neglected maintenance, fixed-caliper brakes that are operating in a fundamentally satisfactory manner may namely give rise to problems in respect of comfort and associated braking noises (brake squeal). Corresponding phenomena relating to comfort are described by the vehicle drivers or test drivers by terms such as "rubbing", "grinding", "groaning" and also squeal or the like. A change in the method of support in conjunction with a change in the direction of rotation of the brake disk can give rise to rattling noises, which tend to irritate an attentive or careful vehicle driver.

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

Other objects, features and characteristics of the present invention, as well as the methods of operation and the functions of the related elements of the structure, the combination of parts and economics of manufacture will become more apparent upon consideration of the following detailed description and appended claims with reference to the accompanying drawings, all of which form a part of this specification. It should be understood that the detailed description and specific examples, while indicating the preferred embodiment of the disclosure, are intended for purposes of illustration only and are not intended to limit the scope of the disclosure.

BRIEF DESCRIPTION OF THE DRAWINGS

Further details of the invention will become apparent from the description with reference to the drawing. In partially simplified form, the drawing shows symbolically, in many different views and/or on an enlarged or reduced scale.

DETAILED DESCRIPTION

The backing plate 1 forms a central and separately pre-produced component of a disk brake lining 2. The backing plate 1 is cut out of a flat, strip-shaped sheet-steel material, in particular being fine-blanked or laser-cut for example, and is used as a carrier for a compacted friction-material mixture 3, which is fixed largely centrally and directly or indirectly on a front side 4 of the backing plate 1. The backing plate 1 furthermore has protrusions on diametrically opposite end faces 6, 7, which are free from friction material. In this case, a retaining protrusion 10 is distinguished from a guide protrusion 12, each of these may be oriented tangentially outward. According to one embodiment the retaining protrusion 10 is formed with a through-hole 11, whereas the guide protrusion 12 is designed as a jaw opening 13 having a receiving pocket 14 and a relief groove. Accordingly, the retaining protrusion 10 is intended by design to define a fixed bearing predefined in a fixed manner on one side for suspending the disk brake lining 2 in the housing 31 of the brake, whereas the jaw opening 13 with the receiving pocket 14 of the guide protrusion 12 is intended by design to form a floating or thrust bearing as a rotation lock. Accordingly, a statically determined and simultaneously comfort-oriented bearing arrangement between the disk brake lining 2 and the motor-vehicle partially lined disk brake 30 is indicated by means of a backing plate 1 in a manner which allows inward-pivot mounting.

In an additional embodiment of the backing plate 1, it is envisaged that the retaining protrusion 10 with through-hole 11 is arranged diagonally offset relative to the guide protrusion 12 with jaw opening 13 and receiving pocket 14 in such a way that there is a radially maximized distance between the points of support. Accordingly, the targeted action of a pair of forces on the backing plate 1 is made possible, resulting in an inward-turning torque on the backing plate 1 during forward travel and an outward-turning torque on the backing plate 1 during reverse travel, without interchanging the predetermined positioning of the fixed and floating bearing arrangement.

Incorrect assembly or confusion is excluded by coding integrated into the design in accordance with the poka yoke principle. For example, in one embodiment the through-hole 11 and the jaw opening 13 have differently or identically dimensioned diameters, and wherein associated retaining pins 21 and guide pins 22, for their part, have matching and identically or differently dimensioned diameters.

The floating bearing function can be implemented in a better way if the guide protrusion 12 has prongs 15, 16 of fork-shaped configuration and if the receiving pocket 14 defines two mutually parallel guide surfaces 17, 18 obliquely (cf. detail drawing) or parallel to the tangential direction, which surfaces adjoin the jaw opening 13, and if the guide surfaces 17, 18 are connected opposite the jaw opening 13 by a base 19, and wherein the base 19 is designed in such a way that it is deepened by a relief groove 20.

The one embodiment furthermore relates to a novel disk brake lining 2 comprising a backing plate 1 and having the characterizing features of the additional independent patent claim. Accordingly, the backing plate 1 is provided asymmetrically and only on one end face 6 with a retaining protrusion 10 and a through-hole 11 for receiving a retaining pin 21, such that the through-hole 11 is arranged on the backing plate 1 at a distance a radially below the center or line of action, and the associated retaining pin 21 can accordingly engage underneath, and wherein the backing plate 1 has, on an opposite end face 7, which may be radially above the line of action or center, a jaw opening 13 having a receiving pocket 14, and a guide pin 22 can engage positively in the receiving pocket 14 through the jaw opening 13 in such a way that the guide pin 22 and the retaining pin 21 are arranged at a defined distance b from one another in the tangential direction T. Tangential forces are accordingly transmitted substantially completely between the retaining protrusion 10 and the retaining pin 21, whereas the guide pin 22 and the receiving pocket 14 act as it were as a rotation lock or thrust bearing. In summary, there is a functional separation such that the receiving pocket 14 having the guide surfaces 17, 18 is provided substantially for the transmission of radially oriented disk-brake lining guiding forces, whereas the retaining protrusion 10 having the through-hole 11 is provided substantially for the transmission of tangentially oriented braking forces.

The floating bearing function is improved if the receiving pocket 14 defines two guide surfaces 17, 18 parallel to or oblique with respect to the tangential direction T, which adjoin the jaw opening 13 and the recessed base 19 having a relief groove 20, and wherein in each case one of the guide surfaces 17, 18 is suitable for providing a means of support for the brake disk lining in the radial direction R on the associated guide pin 22 in the braking mode. Since, by virtue of the relief groove 20, the base 19 is formed with play relative to the guide pin 22, a particularly corrosion-resistant, i.e. self-cleaning, and low-maintenance design is obtained.

In principle, it is advisable for ergonomic reasons if the mutual transitions are in the form of rounded cavities, at least in the contour between the two guide surfaces 17, 18 and the base 19, i.e. have two or more curved transitional sections.

One-piece production of the brake caliper housing 31 by casting is made easier if the retaining pins 21 and guide pins 22 are formed integrally in one piece thereon in cylindrical form. However, it is also possible in principle to produce cylindrical pins separately and to fix them detachably or non-detachably on the housing 31.

A through-hole 11 has opposite circumferential surfaces which are at different distances from one another in the radial and axial directions. In particular, a predominantly radially oriented slotted hole is possible, the diameter of which in the radial direction R is made larger by means of relief grooves than the diameter thereof in the tangential direction T.

An additional embodiment relates to a novel motor-vehicle partially lined disk brake 30/fixed-caliper disk brake, wherein each housing leg 32, 33 has a retaining pin 21 as part of the fixed bearing arrangement for absorbing circumferential force as well as a guide pin 22 as part of the floating bearing arrangement to provide a rotation lock for the disk brake lining 2 received, and wherein each retaining pin 21 engages on a through-hole 11 and each guide pin 22 engages on a receiving pocket 14 of the backing plate 1 of the disk brake lining 2 in such a way that entry-side pull support for the disk brake lining 2 on the retaining pin 21 due to braking during forward travel and exit-side push support for the disk brake lining on the retaining pin 21 due to braking during reverse travel are defined. Consequently, there is an inward-pivoting inward-turning torque in relation to the axis of rotation of the wheel with the retaining pin 21 as the instantaneous pole during forward travel, and wherein an upper guide surface 17 of the receiving pocket 14 rests on the guide pin 22 for the purpose of floating support (rotation lock). Conversely, the disk brake lining 2 undergoes an outward-pivoting outward-turning torque during reverse travel, wherein a lower guide surface 18 of the receiving pocket 14 rests on the guide pin 22 to provide a rotation lock.

In an embodiment of a fixed-caliper disk brake 30, which is coded, it is envisaged that each retaining pin 21 is provided in such a way as to be positioned radially on the inside in relation to a center Z of the disk brake lining and that each guide pin 22 is may be provided so as to be positioned radially on the outside in relation to the center Z of the disk brake lining. In an additional embodiment, it is possible for the housing 31 to have a disk brake lining receptacle of asymmetric configuration, the contour of which is adapted to the asymmetrically cut-out backing plate 1 of the disk brake lining 2, with the result that there is mutually positive and positionally correct shape coding, which automatically ensures a single positionally correct assembly pairing of the disk brake lining 2 and the housing 31 (poka yoke). If required, this modification is expediently supplemented by allowing for the provision of two pins of identical size dimensions on each housing leg 32, 33, and for through-holes and receiving pockets, each may be of identical width, to be provided on the associated disk brake lining 2. On the other hand, standardized pin diameters reduce logistical expenditure.

As an alternative, it is possible that each housing leg 32, 33 has a retaining pin 21 and a guide pin 22, which have two diameters of different dimensions, and that a through-hole 11 and a receiving pocket 14 with a correspondingly adapted diameter are provided on the associated 6. This can help to avoid mismatching and make possible a weight saving.

According to one embodiment, the proposal is to transmit the tangential force (braking force) on the backing plate 1/disk brake lining 2 to a retaining pin 21 fixed in relation to the housing, starting from the backing plate 1, and to do so without a change of location and in all cases via a central fixed bearing specified in a defined way and comprising a retaining protrusion 10 having a through-hole 11. This takes place both for forward travel and for reverse travel. The backing plate 1 is asymmetrically shaped and carries a compacted friction-material mixture 3 on a front/forward-facing side 4.

The fixed bearing is located on the end face 6 and significantly below the center/piston center Z. For the preferential direction of rotation (forward travel) of the friction ring, it is specified that the fixed bearing is positioned on the entry side and conversely for the secondary direction of rotation (reverse travel). In the main direction of rotation (forward travel), the backing plate 1 is therefore supported predominantly under tensile stress by the fixed bearing formed. In the reverse direction of rotation (reverse travel), however, the backing plate 1 is supported via the same fixed bearing predominantly under compressive stress on the backing plate 1.

At least to simplify housing interfaces, the guide pin 22 fixed in relation to the housing can may have identical cross sections, just like the retaining pin 21. In contrast, the cross section in the region of the guidance and support of the friction lining can be reduced in comparison with the retaining pin 21. This is because the guiding pin 22 is used only as a thrust bearing or as a rotation lock for the disk brake lining 2, and therefore a particularly massive configuration is not required and the stress on the guide pin 22 is significantly reduced. The efficiency thereof can therefore be increased if its cross section d is made smaller than the cross section D of the retaining pin 21 and the requirement for material is reduced.

At the same time, it is possible to save weight and to provide at least the same dimensions for the housing interfaces and drilling tools for producing identical housing interfaces in the housing leg 32, 33 (in order to standardize the production environment). To further simplify the logistics and also to implement a common-parts strategy, it is quite possible in principle for the guide pin 22 to be embodied with the same shaping and cross section as the support pin 21 throughout. In principle, it is possible in all the embodiments to make one or both pins at least partially hollow, but at least to embody them as cold-pressed components in order to use the material as efficiently as possible and may be as cold-hardened components. Although reference has been made in all cases above to pins that can be fitted separately on the housing 31, it is, of course, equally possible, as a further improvement of a corresponding fixed-caliper disk brake, to form the pins in one piece with the housing 31 on each housing leg 32, 33, i.e. by casting.

A guide protrusion 12 of open configuration in the form of fork prongs, having a jaw opening 13 and a receiving pocket 14 for receiving the guide pin 22, is positioned on the exit side on the backing plate 1, on the end face 7 opposite the fixed bearing and may be radially above the center/piston center Z. The open configuration allows simple pivot-in assembly of the housing 31, together with the guide pin 22, and the disk brake lining 2. However, insofar as there is a risk that the fork prongs 15, 16 will vibrate relative to one another in the manner of a tuning fork, it is possible in principle to envisage, as a supplementary measure relating to comfort and noise mitigation, that the fork prongs 15, 16 are connected firmly to one another at the open end of the jaw opening by a bridge 23. Additional attenuation measures in the domain of machine acoustics and/or offsetting of masses are likewise possible.

The retaining pin 21, which is in the form of a circular ring in cross section, passes completely through the through-hole 11 of the retaining protrusion 10. To reduce normally oriented mutual contact stresses, the contour of the circumferential surface of the through-hole 11 is shaped so as to be curved, hugging the largely circular-ring-shaped surface curvature of the retaining pin 21, in such a way that there is contact with as little friction as possible between the retaining pin 21 and the retaining protrusion on the one hand, while, on the other hand, there is support for the disk brake lining 2/backing plate 1 which is as far as possible wear- and weather-resistant and maintenance-free. Given complex climatic stresses on a wheel brake system, including the most extreme salt spray, the mutually cooperating metallic materials (pins, backing plate) may be exhibit a largely passive electrochemical behavior relative to one another. For this purpose, they can have mutual electrical passivation or insulation, in particular inherently as little tendency as possible for electrical local element formation/contact corrosion. It is expedient here if the selection of pairs of cooperating materials is such that, as a result of the pairing, as low as possible a potential difference, i.e. a low tendency for local elements in the electrochemical series of the metals, is achieved. At least one of the contact components involved may be provided with an electrically insulating finish, at least on the surface, or if the respective base material is simply an electric non-conductor in any case. For example, it is possible for at least one of the contact components involved (pins, backing plate 1) to be made of a rust-resistant material. In this context, an electrically quasi-passivated pairing using a conventionally coated blanked sheet-steel material as a backing plate 1 is recommended. In general, this is of course possible in combination with a high-grade steel material or with an aluminum material or with a titanium material or with a corrosion-resistant cast material (quasi-passivated casting skin surface) when used for pins. Of course, rationalized hybrid forms thereof are also conceivable, where, for example, one of the pins is formed in one piece with the cast housing and the other is provided as a separate pin and is made from a different material.

Figure 1:
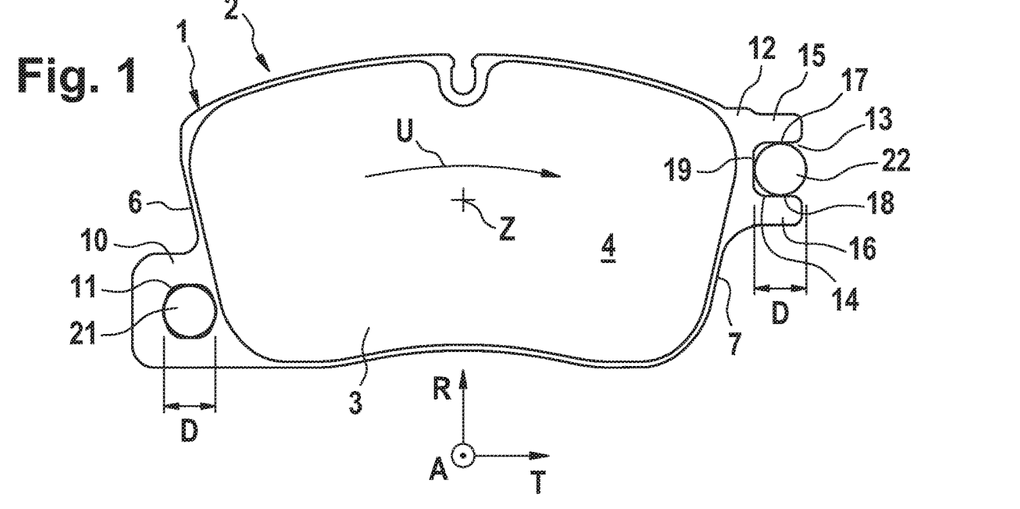
FIG. 1: asymmetrically supported disk brake lining with identically dimensioned support and guide pin diameters in a front view and on a reduced scale.
Figure 2:
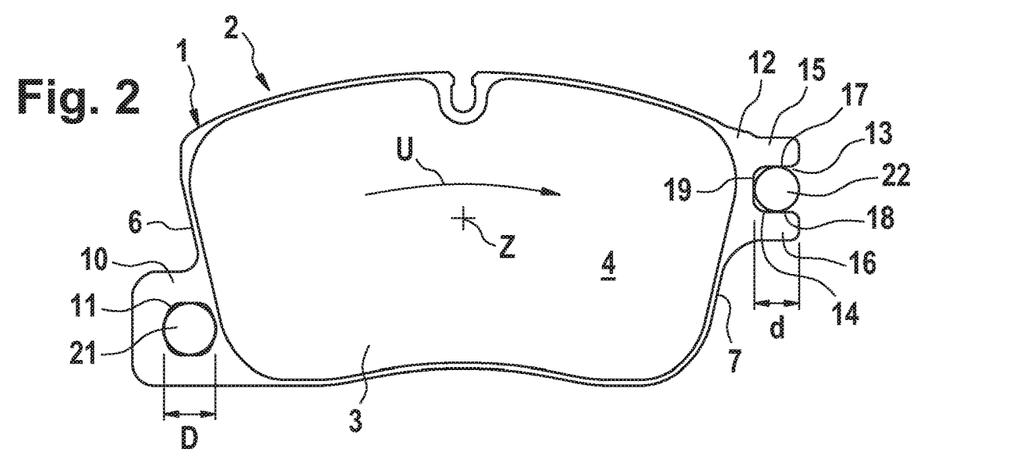
FIG. 2: asymmetrically supported disk brake lining with differently dimensioned support and guide pin diameters in a front view and on a reduced scale.
Figure 3:
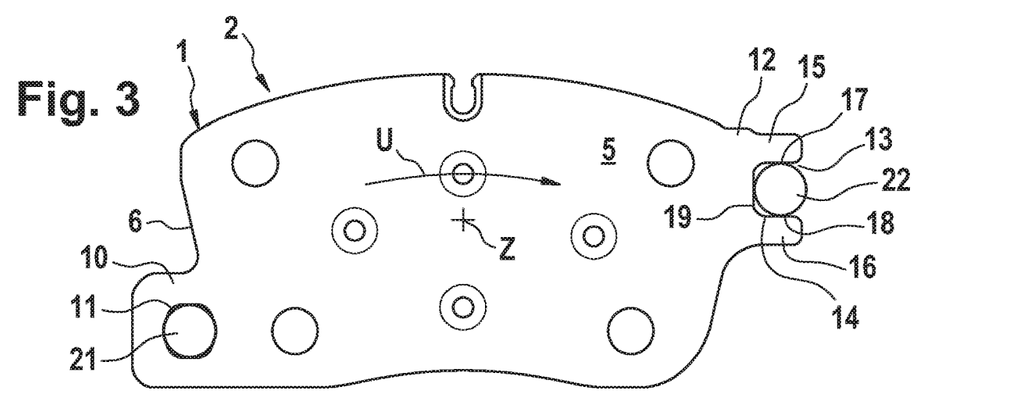
FIG. 3: disk brake lining as in FIG. 1 in a rear view.
Figure 4:
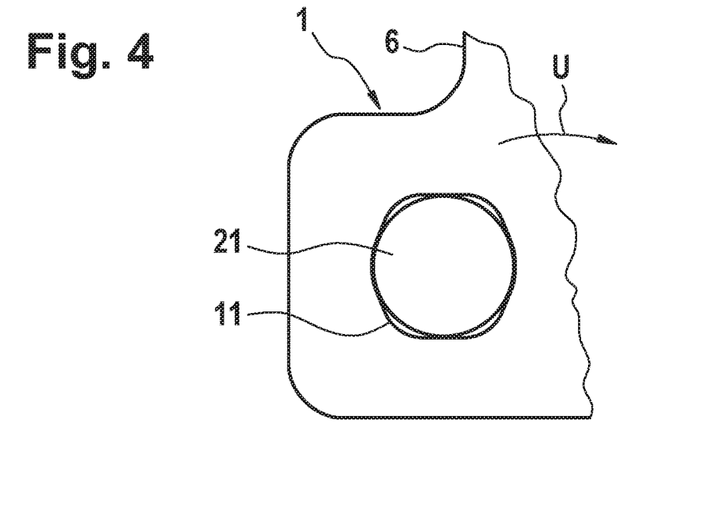
FIG. 4: enlarged detail view of the eye, through-hole and support pin in FIG. 1 in front view.
Figure 5:
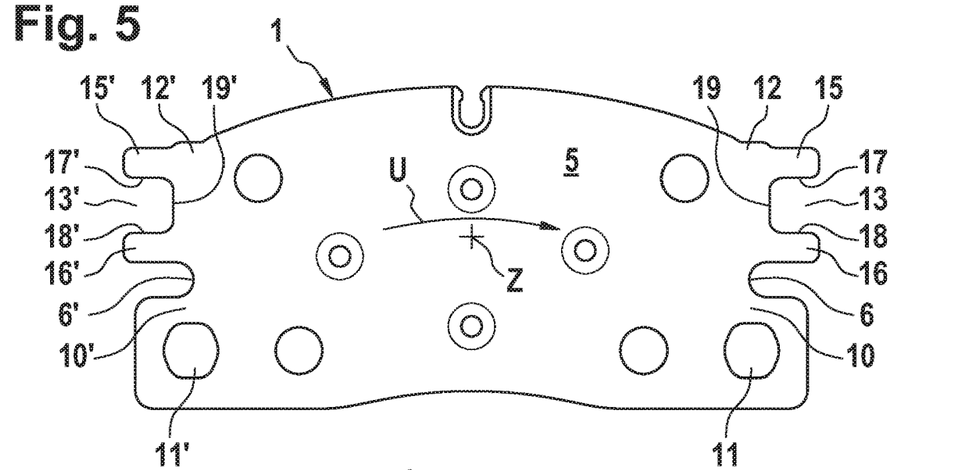
FIG. 5: rear view of a symmetrical backing plate.
Figure 6:
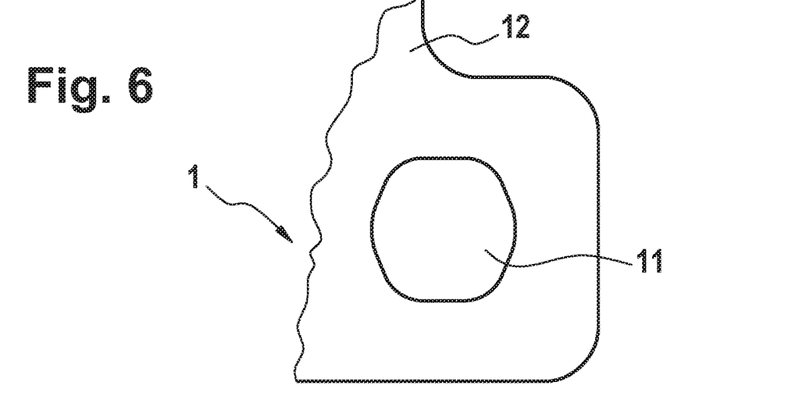
FIG. 6: enlarged rear view of the eye.
Figure 7:
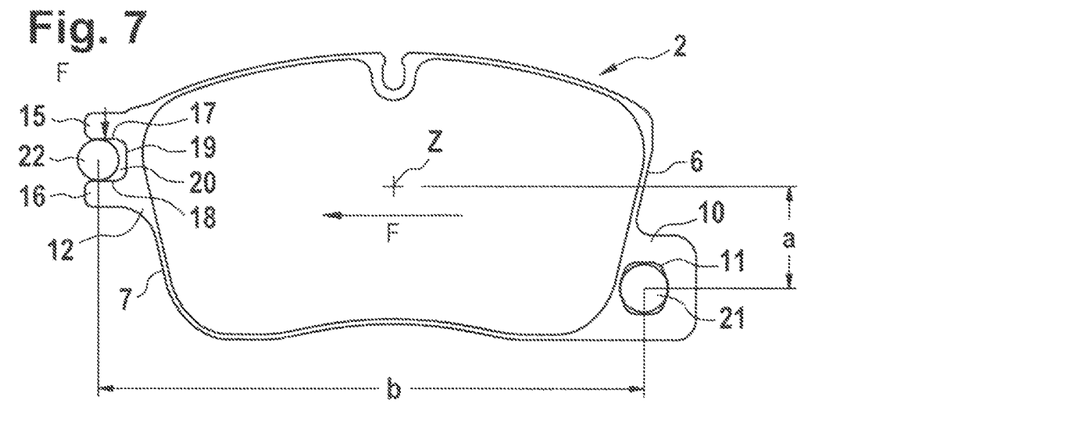
FIG. 7: schematic diagram illustrating the fundamental principles of a friction lining support arrangement according to the invention with a support pin and guide pin.
Figure 8:
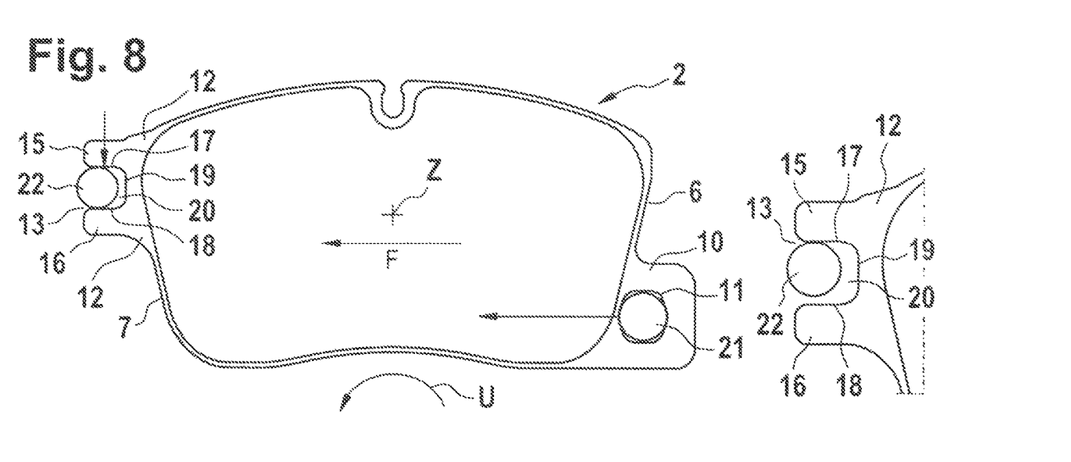
FIG. 8: schematic diagram illustrating the fundamental principles of a friction lining support arrangement according to the invention with a support pin and guide pin during forward travel (primary direction of rotation)
Figure 9:
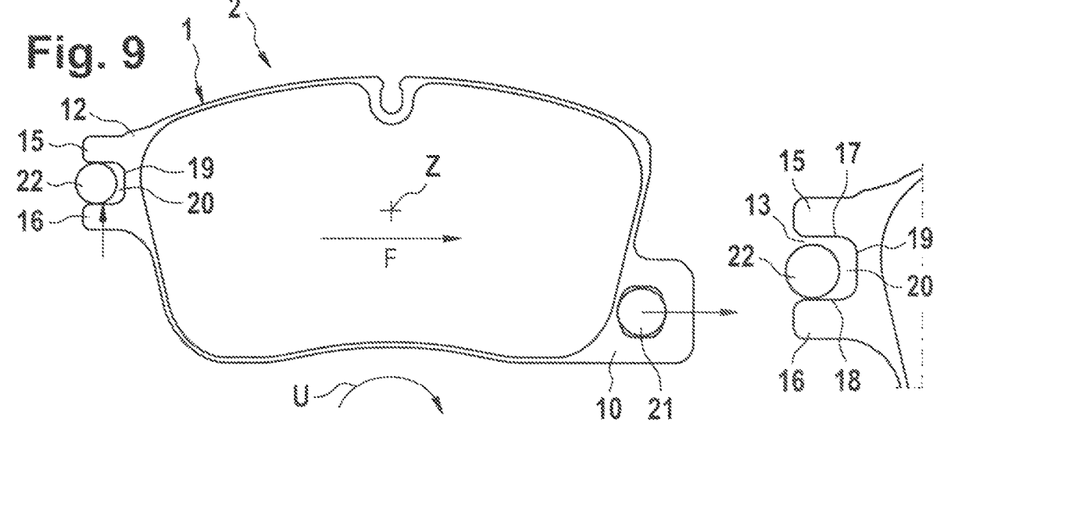
FIG. 9: schematic diagram illustrating the fundamental principles of a friction lining support arrangement according to the invention with a support pin and guide pin during reverse travel (secondary direction of rotation)

To particularly simplify assembly and to reduce the number of different parts, a brake lining carrier or a fixed-caliper brake housing 31 can also in principle be embodied in such a way that a brake lining 2 of standard symmetrical configuration can be used both inboard and outboard, with the support for the disk brake lining 2 being otherwise the same (FIG. 5).

In comparison with a conventionally alternating friction lining support with tangential force support in the housing 31 that alternates in accordance with the direction of rotation, the tangential force support is performed centrally by means of the retaining pin 21, resulting in a rationalized tolerance chain, wherein only the relative tolerances of the retaining pin 21 and the through-hole 11 are decisive in the context of the tangential force support. Thus, it is made possible in a surprisingly simple manner to counteract reversing rattle by means of locally reduced play in the region between the retaining pin 21 and the through-hole 11 in a manner which is largely neutral in terms of cost. The guide pin 22 is subject to little stress and assumes only the radial support or rotational securing of the disk brake lining 2 in the housing 31. If required, the guide pin 22 can therefore be given a correspondingly reduced cross section, and it is recommended that the retaining pin be cast integrally on the housing 31, whereas the guide pin 22 is may be of separate design, or vice versa.

The retaining protrusions 10 and guide protrusions 12, which are each provided on one side of the backing plate 1, i.e. in an asymmetrically offset manner, eliminate redundancies through consistent separation of functions. The utilization of the backing plate 1 as a friction lining carrier, i.e. the useful friction area, is improved. This is accompanied by improved scalability between the size of the backing plate 1, the useful friction area and the possible piston support/number of pistons 34, 35. By means of friction lining support at diametrically opposite locations on the end faces and additionally with a diagonal offset, there is an improvement in the NVH behavior. A sheet-metal strip pattern for the manufacture of the backing plate is additionally made more compact. Moreover, the mass/stiffness ratio of the overall brake 30 is improved. The selected contact forces in the lining support can be significantly greater owing to the positive engagement. Normal guiding forces that increase with increasing circumferential load and have a constant direction of action in the lining support provide the best preconditions for good braking noise behavior. There is a significant reduction in the guiding play on the pin transmitting the braking force and therefore the braking noises when changing the direction of travel are minimized (reversing rattle, chatter). Avoidance of corrosion-related stiffness in the brake lining support and guidance.

Figure 10:
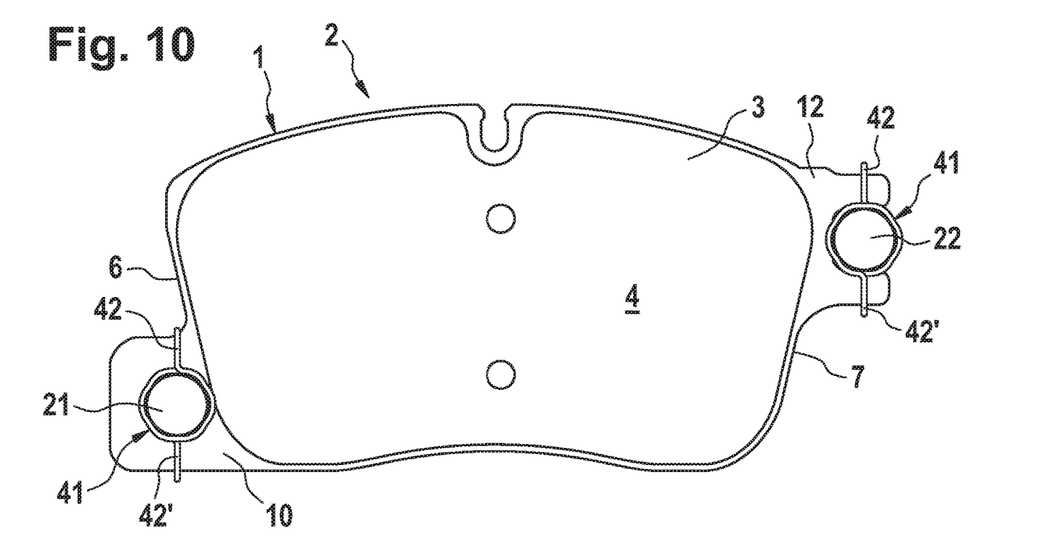
FIG. 10: friction lining with springing (low drag) in a front view and on a reduced scale.
Figure 11:
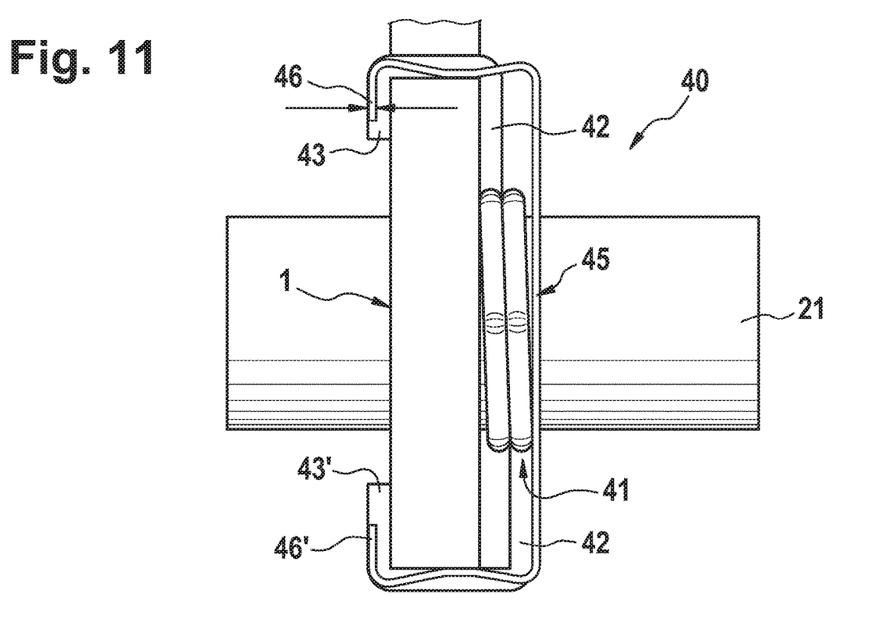
FIG. 11: enlarged detail of the springing in section along the line XI-XI in FIG. 10, FIG. 12: the cooperating components of a springing arrangement as per FIG. 10 approximately to scale and as an exploded drawing.
Figure 12:
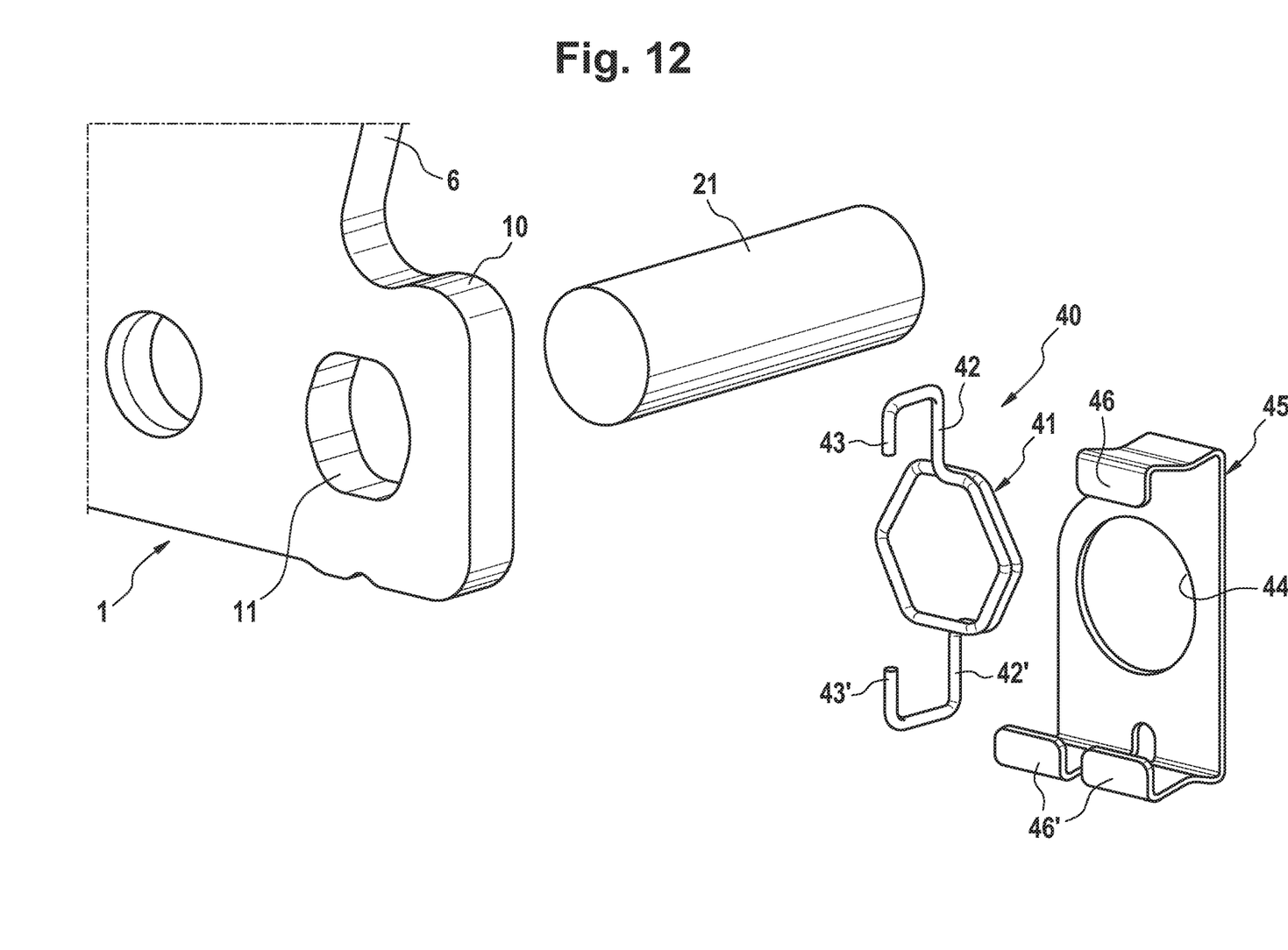

According to FIGS. 10-12, each disk brake lining 2 can be assigned at least one return means 40, which serves to ensure readjustment of the friction lining for wear when required and, at the same time, helps to avoid residual braking torques. Two return means 40, 40' may be provided on each disk brake lining 2 in the region of each bearing—i.e. on the entry side and on the exit side. In this case, the design of each return means 40, 40' comprises a wrap spring 41 made from bent wire, the center of which elastically grips a pin circumference (support pin or guide pin) with the aid of the loop. Emanating from the loop are diametrically oriented retaining legs 42, which engage by means of claws 43 on the respective protrusion (retaining protrusion 10, guide protrusion 12) of the backing plate 1 in order to fix the wrap spring 41 on the backing plate 1. In addition, each wrap spring 41 is overlapped by a respective sheet-metal element 45, which has a central through-hole 44 for the respective pin and, for its part, is releasably fixed by means of retaining clips 46 on the respective protrusion of the backing plate 1. When a predefined axial play between the wrap spring 41 and the sheet-metal element 45 is exceeded, the sheet-metal element 45 slides axially over the pin circumference, taking the wrap spring 41 with it, and thereby automatically compensates friction lining wear. In addition or as a supplementary measure, each backing plate 1 can be releasably fixed by means of at least one elastic clip in the cup-shaped cavity/interior of the respective piston 34, 35. As a result, a return effect may additionally be imposed upon the disk brake lining 2 by the brake piston or pistons 34, 35.

Figure 13:
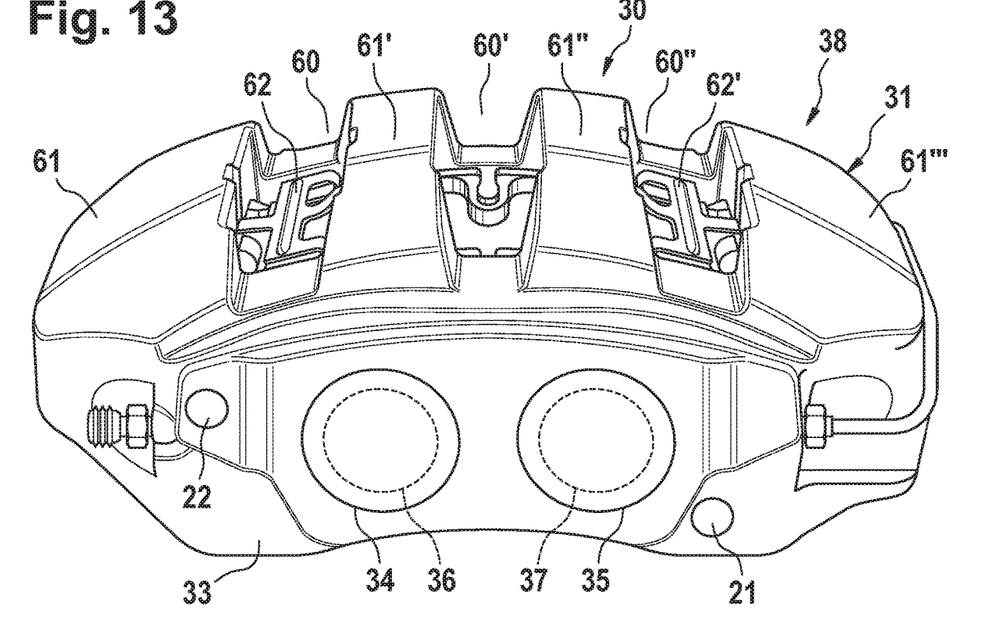
FIG. 13: fixed-caliper brake in a four-piston embodiment with four bridge sections and three bridge apertures including the springing, in perspective and on a reduced scale.
Figure 14:
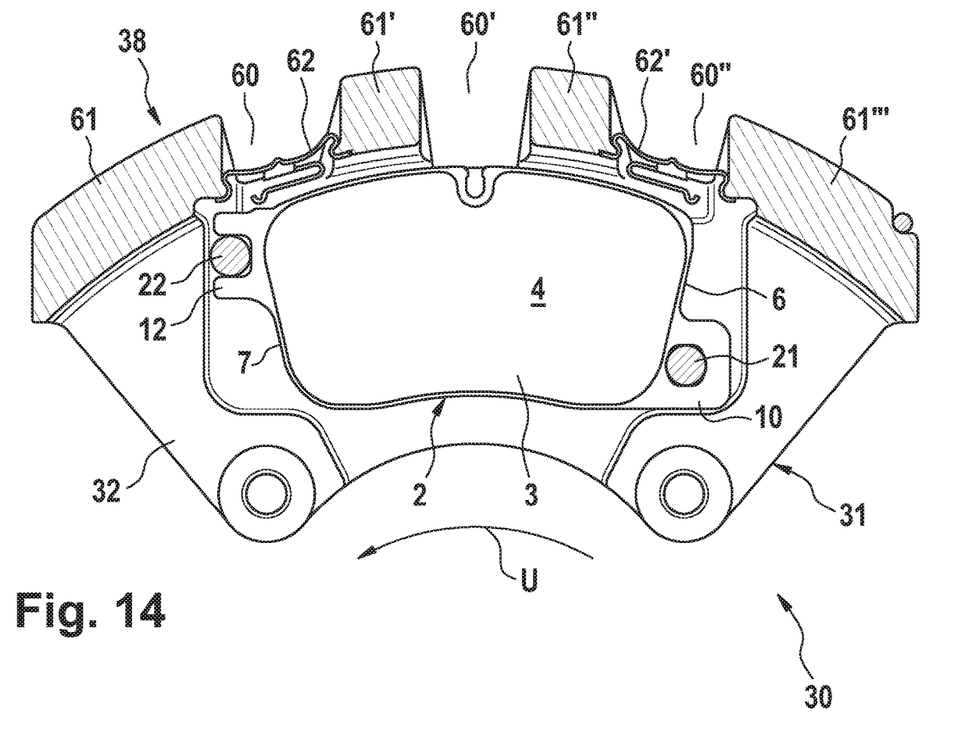
FIG. 14: fixed-caliper brake as per FIG. 13 in longitudinal section.
Figure 15:
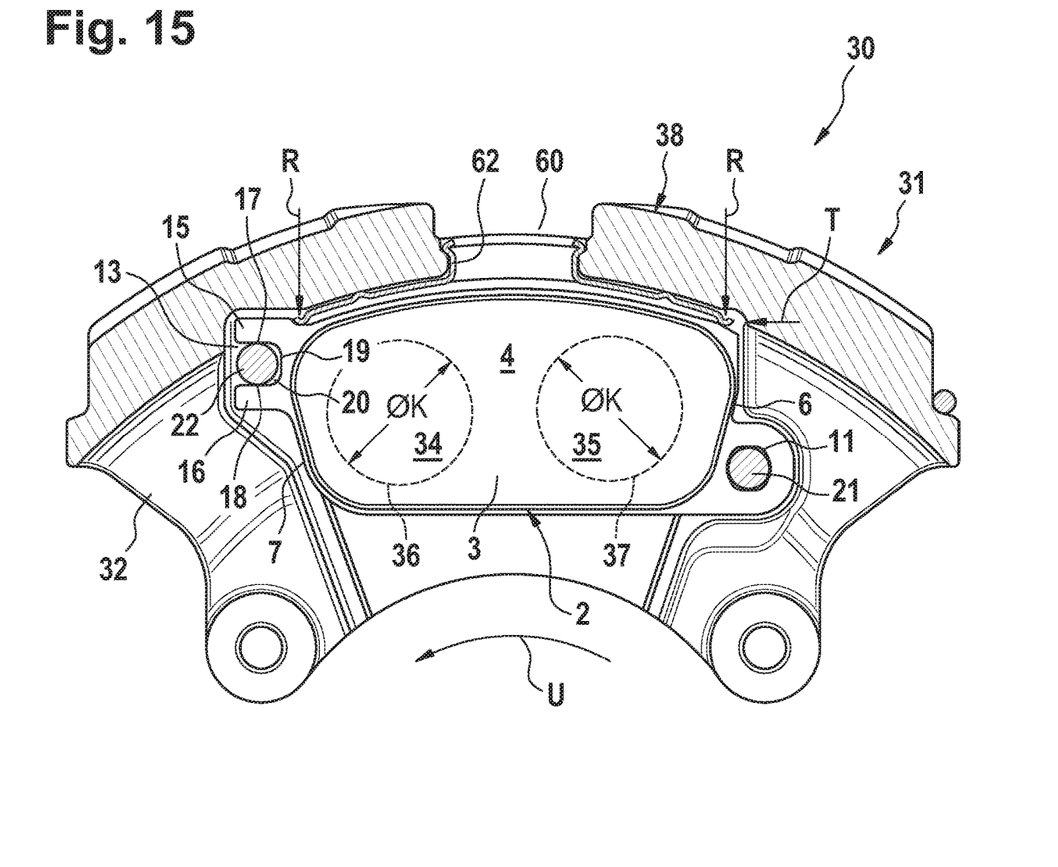
FIG. 15: a different embodiment of a fixed-caliper brake in a four-piston embodiment including the springing and a centrally positioned bridge aperture.
Figure 16:
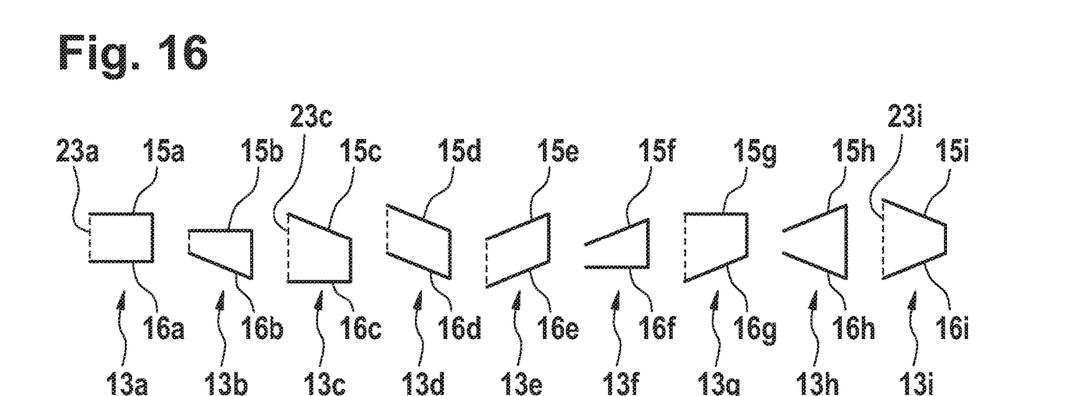
FIG. 16: differently angled versions of jaw openings 13a-i of anti-parallel configuration, in some cases with a bridge 23, in a highly schematic illustration and on a reduced scale.

The fixed-caliper housing 31 may be of open configuration on the bridge side in order to allow better through-ventilation and cooling of the wheel brake system. In principle, it is possible here to provide one or more bridge apertures 60, 60', 60" (FIG. 15; 13+14) alternating with corresponding bridge sections 61, 61', 61", 61'". As will be apparent from FIGS. 13-15, the bridge apertures 60, 60" can accommodate additional spring means (top springs) 62, 62', which are each clamped under radially elastic preload between the backing plate 1 of the disk brake lining 2 and the housing bridge 38, and each allow a radially inward- or radially outward-directed elastic preload between the disk brake lining 2 and the housing 31.

The foregoing preferred embodiments have been shown and described for the purposes of illustrating the structural and functional principles of the present invention, as well as illustrating the methods of employing the preferred embodiments and are subject to change without departing from such principles. Therefore, this invention includes all modifications encompassed within the scope of the following claims.

The invention claimed is:

1. A backing plate assembly for a motor-vehicle disk comprising:
    a backing plate;
    a friction material fixed to a front side of the backing plate;
    a retaining protrusion and an open guide protrusion oriented tangentially outward on diametrically opposite end faces of the backing plate from one another;
    wherein the retaining protrusion is located radially inside a center of the backing plate on one of the end faces, wherein the retaining protrusion defines a through-hole;

wherein the open guide protrusion is located radially outside the center of the backing plate, wherein the open guide protrusion defines a jaw opening having a receiving pocket; and wherein parallel to a tangential direction T, the receiving pocket defines two guide surfaces arranged parallel to one another which adjoin the jaw opening, and in that the guide surfaces are connected, opposite the jaw opening, by a base, and wherein the base is designed in such a way that it is deepened by a relief groove which defines a predetermined play between the guide pin and the receiving pocket in the tangential direction.

2. The backing plate assembly as claimed in claim 1, wherein the friction material is at least one of: fixed permanently, fixed centrally, fixed directly and fixed indirectly on the backing plate.

3. The backing plate assembly as claimed in claim 2, wherein the fork prongs are connected to one another by a bridge.

4. The backing plate assembly as claimed in claim 1, wherein the through-hole and the jaw opening having the receiving pocket are arranged on the end faces of the backing plate so as to be offset diagonally opposite one another.

5. The backing plate assembly as claimed in claim 1, wherein the through-hole and the jaw opening have one of different and identical receiving cross sections.

6. The backing plate assembly as claimed in claim 1, wherein the guide protrusion has at least two fork prongs arranged largely parallel to one another.

7. A disk brake assembly for a motor-vehicle comprising:
an asymmetrical backing plate;
a friction material fixed to a front center side of the backing plate, wherein the friction material has a friction surface with ideal frictional force action in the center with a tangentially oriented line of action of the force and, wherein the friction material can be pressed against a friction ring arranged orthogonally with respect thereto;
a retaining pin and an guide pin axially oriented arranged parallel to one another for at least one of supporting and guiding the disk brake lining;
wherein the retaining protrusion is located radially below a center of the backing plate on one of the end faces, wherein the retaining protrusion defines a through-hole and one of the axially oriented pins is at least partially engageable positively within the through-hole;
wherein the open guide protrusion is located radially above the center of the backing plate, wherein the open guide protrusion defines a jaw opening having a receiving pocket and the other of the axially oriented pins is at least partially engageable positively in the receiving pocket through the jaw opening;
wherein a tangential distance between the support by the guide pin and the retaining pin on the backing plate is maximized; and wherein parallel to a tangential direction T, the receiving pocket defines two guide surfaces arranged parallel to one an-other, which adjoin the jaw opening, and in that the guide surfaces are connected, oppo-site the jaw opening, by a base, and wherein the base is designed in such a way that it is deepened by a relief groove which defines a predetermined play between the guide pin and the receiving pocket in the tangential direction.

8. The disk brake assembly as claimed in claim 7, wherein the receiving pocket and fork prongs define two guide surfaces parallel to the tangential direction, which guide surfaces adjoin the jaw opening, and wherein in each case one of the guide surfaces supports the disk brake lining in the radial direction on the respective guide pin.

9. The disk brake assembly as claimed in claim 7, wherein at least two curved transitional sections are provided between the guide surfaces and the base.

10. The disk brake assembly as claimed in claim 7, wherein the retaining pin and the guide pin are designed with a circular cross section and so as to be cylindrical.

11. The disk brake assembly as claimed in claim 7, wherein there is functional separation between end faces such the receiving pocket having the guide surfaces is provided for the transmission of radially oriented disk-brake lining guiding forces, and whereas the retaining protrusion having the through-hole is provided for the transmission of tangentially oriented circumferential braking forces.

12. The disk brake assembly as claimed in claim 7, wherein the through-hole is designed as a slotted hole oriented in a radially extended manner, the diameter of which in the radial direction is made larger with the aid of relief grooves than the diameter thereof in the tangential direction.

13. The disk brake assembly as claimed in claim 7, wherein there is entry-side pull support on the retaining pin due to braking during forward travel and exit-side push support on the retaining pin due to braking during reverse travel.

14. The disk brake assembly as claimed in claim 7, wherein an inward-turning torque on the disk brake lining, pivots inward toward the axis of rotation of the wheel, during forward travel, and wherein an upper guide surface rests on the guide pin.

15. The disk brake assembly as claimed in claim 7, wherein an outward-turning torque on the disk brake lining, pivots out-ward away from the axis of rotation of the wheel, during reverse travel, and wherein a lower guide surface of the receiving pocket rests on the guide pin.

* * * * *